United States Patent
Winiarczyk et al.

(12) 
(10) Patent No.: US 12,250,322 B2
(45) Date of Patent: Mar. 11, 2025

(54) PROCESSING OF MESH NETWORK DATA PACKETS HAVING INVALID CYCLIC REDUNDANCY CHECK (CRC) VALUES

(71) Applicant: Silvair Sp. z o.o., Cracow (PL)

(72) Inventors: Piotr Winiarczyk, Cracow (PL); Ravi Kiran Bamidi, Bangalore (IN)

(73) Assignee: Silvair Sp. z o.o., Cracow (PL)

( * ) Notice: Subject to any disclaimer, the term of this patent is extended or adjusted under 35 U.S.C. 154(b) by 274 days.

(21) Appl. No.: 17/879,142

(22) Filed: Aug. 2, 2022

(65) Prior Publication Data

US 2023/0051075 A1  Feb. 16, 2023

Related U.S. Application Data

(60) Provisional application No. 63/233,377, filed on Aug. 16, 2021.

(51) Int. Cl.
| | | |
|---|---|---|
| *H04L 29/00* | (2006.01) | |
| *H04L 9/32* | (2006.01) | |
| *H04W 4/80* | (2018.01) | |
| *H04W 12/037* | (2021.01) | |

(52) U.S. Cl.
CPC .......... *H04L 9/3242* (2013.01); *H04W 4/80* (2018.02); *H04W 12/037* (2021.01)

(58) Field of Classification Search
CPC .... H04L 9/3242; H04W 4/80; H04W 12/037; H04W 12/106; H04W 12/108; H04W 12/50

See application file for complete search history.

(56) References Cited

U.S. PATENT DOCUMENTS

| | | | | |
|---|---|---|---|---|
| 2010/0061272 A1* | 3/2010 | Veillette | ............... | H04W 40/005 |
| | | | | 370/254 |
| 2011/0103394 A1* | 5/2011 | Vogt | ..................... | H04L 61/2557 |
| | | | | 370/401 |
| 2015/0100856 A1* | 4/2015 | Zhang | ................... | H03M 13/09 |
| | | | | 714/776 |
| 2015/0373753 A1* | 12/2015 | Turon | ................. | H04W 12/088 |
| | | | | 370/254 |
| 2018/0254861 A1* | 9/2018 | Cherian | ................. | H04L 1/1854 |
| 2019/0281449 A1* | 9/2019 | Luo | ........................... | H04L 63/06 |
| 2019/0373608 A1* | 12/2019 | Weiss | ................. | H04W 72/0446 |
| 2021/0078536 A1* | 3/2021 | Stitt | ......................... | H01Q 3/24 |

* cited by examiner

*Primary Examiner* — Ghazal B Shehni

(74) *Attorney, Agent, or Firm* — McGeary Cukor LLC; Kenneth Ottesen; Jason Paul DeMont

(57) ABSTRACT

A technique for processing Bluetooth Mesh packets that comprise erroneous cyclic redundancy check (CRC) values. The disclosed mesh node receives packets, each of which comprising a Protocol Data Unit (PDU) and a cyclic redundancy check (CRC) field. The PDU comprises an AD Data field with multiple octets; the AD Data field itself comprises a Network Identifier (NID) field. After determining the value of the CRC field in a first packet to be invalid, and subject to further checks, the mesh node selects a selected set of one or more NID values, based on the validity of the value of the NID field in the first packet. The mesh node then processes at least some of the multiple octets in the AD Data field in the first packet in accordance with a set of network keys that hash to the one or more NID values in the selected set.

18 Claims, 11 Drawing Sheets

700

```
:VAR: failed_checks = 0
:if: [check BDA] is implemented and fails :then: increment failed_checks
:if: [check H] fails :then: increment failed_checks
:if: [check HL] fails :then: increment failed_checks
:if: [check ADL] fails :then: increment failed_checks
:if: [check ADT] fails :then: increment failed_checks
:if: failed_checks > 1 :then: End of packet processing
:if: [check NID] fails :then: increment failed_checks
:if: (failed_checks = 0 OR [check NID] passes) :then:
        Process all matching NIDs
:else:
        :if: failed_checks > 1 :then:
                End of packet processing
        :else:
                Process all NIDs
```

:VAR: failed_checks = 0
:if: [check BDA] is implemented and fails :then: increment failed_checks
:if: [check H] fails :then: increment failed_checks
:if: [check HL] fails :then: increment failed_checks
:if: [check ADL] fails :then: increment failed_checks
:if: [check ADT] fails :then: increment failed_checks
:if: failed_checks > 1 :then: End of packet processing
:if: [check NID] fails :then: increment failed_checks
:if: (failed_checks = 0 OR [check NID] passes) :then:
    Process all matching NIDs
:else:
    :if: failed_checks > 1 :then:
        End of packet processing
    :else:
        Process all NIDs

PROCESSING OF MESH NETWORK DATA PACKETS HAVING INVALID CYCLIC REDUNDANCY CHECK (CRC) VALUES

CROSS-REFERENCES TO OTHER APPLICATIONS

This application claims the benefit of U.S. Provisional Patent Application Ser. No. 63/233,377, which is incorporated by reference herein.

FIELD OF THE INVENTION

The present invention relates to wireless telecommunications in general and, more particularly, to a technique for message processing of mesh network data packets having invalid cyclic redundancy check (CRC) values.

BACKGROUND OF THE INVENTION

Wireless communication devices, and their usage, have become more common over time. There are various reasons for this. Advances in electronic technology have reduced the cost of the increasingly complex devices. Advances in electronic technology have also resulted in smaller and more powerful wireless communication devices, and consequently more useful devices. For example, there exists a variety of wireless communication devices such as portable wireless terminals (e.g., smartphones), personal digital assistants (PDAs), laptop computers, tablet computers, and other electronic devices that are small, are lightweight, and can be easily carried by users. The reductions in cost and size, and associated increase in consumer demand, have proliferated the use of wireless communication devices, making them ubiquitous in everyday life.

As the usage of wireless communication devices has expanded, so has the demand for new and improved features in said devices. More specifically, users demand wireless communication devices that perform new functions and that perform functions faster, more efficiently, and more reliably.

A wireless communication device utilizes one or more wireless communication technologies in order to telecommunicate with other devices and systems. For example, a wireless communication device might communicate using Bluetooth (BT) technology or another wireless technology or technologies, such as a cellular or WiFi technology, and in various combinations. In some cases, a wireless communication device might be a node in a mesh network, such as Bluetooth Mesh network, which provides a way to route data more efficiently than in at least some other types of networks.

A wireless network operating in accordance with the Bluetooth Mesh networking protocol allows for many-to-many communication over Bluetooth radio. The specifications for Bluetooth Mesh have been standardized and are well-understood, allowing for wireless communication devices to interact with one another in various applications, including devices produced by different manufacturers.

SUMMARY OF THE INVENTION

Although the Bluetooth Mesh specifications have been standardized, there is flexibility for implementation outside of the standardized protocols, as realized by the inventors of the present invention disclosed herein. In particular, many fields in a network packet are redundant in respect of the Bluetooth Mesh profile. Also, the integrity of the Bluetooth Mesh Protocol Data Unit (PDU) is protected by the Message Integrity Check for Network (NetMIC) field independently from protection provided by the Cyclic Redundancy Check (CRC) field in the packet. Additionally, various fields in the PDU are indirectly validated by the NetMIC field.

The present invention enables the successful processing of at least some Bluetooth Mesh packets that comprise erroneous CRC values, by using techniques that are based on the foregoing observations by the inventors. An advantage of processing packets that have erroneous CRC values, using at least some of the techniques disclosed herein, is an improved packet processing rate.

In accordance with an illustrative embodiment of the present invention, an illustrative mesh node receives one or more packets transmitted by another mesh node. Each of the one or more packets comprises a PDU and a CRC field. The PDU comprises an AD Data field with multiple octets; the AD Data field itself comprises a Network Identifier (NID) field. The PDU, CRC field, AD Data field, and NID field are defined as part of one or more Bluetooth Specifications.

The mesh node determines whether the value of the CRC field in a first packet of the received one or more packets is valid or invalid. After determining the value of the CRC field to be invalid, and subject to further checks, the mesh node selects a selected set of one or more NID values that comprise either (i) a predetermined set of multiple NID values or (ii) the value of the NID field in the first packet. This is based, at least in part, on the validity of the value of the NID field in the first packet. The mesh node then processes at least some of the multiple octets in the AD Data field in the first packet in accordance with a set of network keys that hash to the one or more NID values in the selected set of NID values. The processing comprises deobfuscating at least a first field.

The mesh node deobfuscates the first field by using a first network key corresponding to a selected NID and then determines whether the value of the deobfuscated first field is valid or invalid, by using a first set of one or more checks disclosed herein. After determining the value of the deobfuscated first field to be valid, the mesh node decrypts, using the first network key, a first encrypted block of M octets within the AD Data field including a second field, wherein M is a positive integer (e.g., M equals 16, etc.). By setting the value of M at an optimal value that is less than the total number of encrypted octets in the AD Data field, the overall processing time can be reduced across network keys. The mesh node then determines whether the value of the decrypted second field is valid or invalid, by using a second set of one or more checks disclosed herein. If the value of the decrypted second field is valid, the mesh node authenticates at least the decrypted octets and processes the authenticated information, such as in one or more conventional ways.

In accordance with the illustrative embodiment, the improved processing of network packets disclosed herein is explained within the context of a Bluetooth Mesh network. As those who are skilled in the art will appreciate after reading this specification, however, the disclosed improvements can be applied to a different type of data network than Bluetooth Mesh, in which the different type of network is governed by an equivalent structure, format, and content, at least as far as the claimed elements are concerned.

An illustrative method comprises: receiving, by a first mesh node, one or more packets transmitted by a second mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications; determining whether the value of the CRC field in a first packet of the one or more packets is valid or invalid; after determining the value of the CRC field to be invalid, selecting a selected set of one or more NID values that comprise either (i) a predetermined set of multiple NID values or (ii) the value of the NID field in the first packet, based at least in part on validity of the value of the NID field in the first packet; and processing at least some of the multiple octets in the AD Data field in the first packet in accordance with a set of network keys that hash to the one or more NID values in the selected set, wherein the processing comprises deobfuscating a first field.

An illustrative mesh node comprises: a receiver configured to receive one or more packets transmitted by another mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications; and a processor configured to: (a) determine whether the value of the CRC field in a first packet of the one or more packets is valid or invalid, (b) after determining the value of the CRC field to be invalid, select a selected set of one or more NID values that comprise either (i) a predetermined set of multiple NID values or (ii) the value of the NID field in the first packet, based at least in part on validity of the value of the NID field in the first packet, and (c) process at least some of the multiple octets in the AD Data field in the first packet in accordance with a set of network keys that hash to the one or more NID values in the selected set, wherein the processor is configured to process by deobfuscating a first field.

An illustrative non-transitory tangible computer readable medium storing computer executable code, comprises code for causing a mesh node to: receive one or more packets transmitted by another mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications; determine whether the value of the CRC field in a first packet of the one or more packets is valid or invalid; after determining the value of the CRC field to be invalid, select a selected set of one or more NID values that comprise either (i) a predetermined set of multiple NID values or (ii) the value of the NID field in the first packet, based at least in part on validity of the value of the NID field in the first packet; and process at least some of the multiple octets in the AD Data field in the first packet in accordance with a set of network keys that hash to the one or more NID values in the selected set, including deobfuscating a first field.

BRIEF DESCRIPTION OF THE DRAWINGS

FIG. 7 depicts method 700 comprising NID selection heuristics that are part of operation 605.

DETAILED DESCRIPTION

Figure 1:
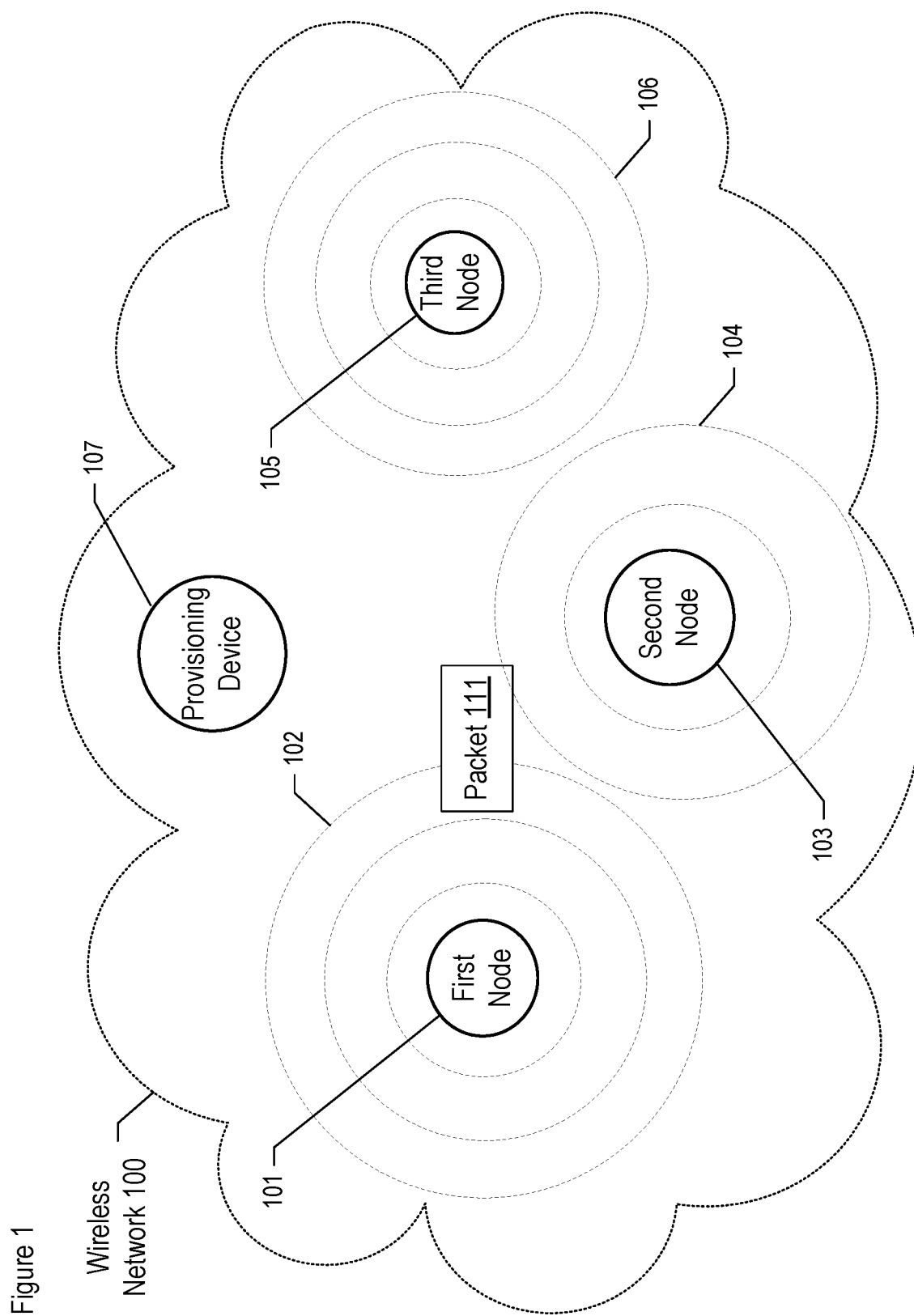
FIG. 1 depicts wireless mesh network 100 in accordance with the illustrative embodiment.

Authenticate—For the purposes of this specification, the infinitive "to authenticate" and its inflected forms (e.g., "authenticating", "authenticated", etc.) should be given the ordinary and customary meaning that the terms would have to a person of ordinary skill in the art at the time of the invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Decrypt—For the purposes of this specification, the infinitive "to decrypt" and its inflected forms (e.g., "decrypting", "decrypted", etc.) should be given the ordinary and customary meaning that the terms would have to a person of ordinary skill in the art at the time of the invention.

Deobfuscate—For the purposes of this specification, the infinitive "to deobfuscate" and its inflected forms (e.g., "deobfuscating", "deobfuscated", etc.) should be given the ordinary and customary meaning that the terms would have to a person of ordinary skill in the art at the time of the invention.

Determine—For the purposes of this specification, the infinitive "to determine" and its inflected forms (e.g., "determining", "determined", etc.) should be given the ordinary and customary meaning that the terms would have to a person of ordinary skill in the art at the time of the invention.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Memory—For the purposes of this specification, the term "memory" is defined as hardware or hardware and software capable of storing information electronically.

Multiple—For the purposes of this specification, the term "multiple" is defined as "more than one."

Node—For the purposes of this specification, the term "node" is defined as a provisioned device.

Octet—For the purposes of this specification, the term "octet" is defined as a unit of digital information in computing and telecommunications that consists of eight bits.

Proper Subset—For the purposes of this specification, the term "proper subset" is defined as a subset that does not constitute the entire set.

Processor—For the purposes of this specification, the term "processor" is defined as hardware or hardware and software that perform mathematical and/or logical operations, and in which operations are controlled and executed.

Protocol Data Unit—For the purposes of this specification, the term "protocol data unit (PDU)" is defined as a single unit of information transmitted among peer entities of a computer network. Depending on the network protocol layer being referred to, a PDU can also be called a "segment", "datagram", "packet", or "frame", for example and without limitation.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are known in the art are depicted in block diagram form in the accompanying figures in order to keep salient aspects of the present invention from being unnecessarily obscured.

FIG. 1 depicts wireless mesh network 100 in accordance with the illustrative embodiment. Mesh network 100 comprises first node 101, second node 103, third node 105, and provisioning device 107. For purposes of clarity, nodes 101, 103, and 105 have different names in this specification, but node 101 (e.g., having at least a switch function, etc.), node 103 (e.g., having at least a relay function, etc.), and node 105 are considered mesh nodes in that they are provisioned devices that are capable of operating within a mesh network. No hierarchical relationship is meant to be implied by the "first," "second," and "third" node designations. The depicted nodes communicate wirelessly with one another, as well as with other mesh nodes, via signal 102 transmitted by first node 101, via signal 104 transmitted by second node 103, and via signal 106 transmitted by third node 105. Device 107 is capable of provisioning nodes 101, 103, and 105.

Network 100 is a mesh data network or computer network that enables communication among the mesh nodes within the network, including nodes 101, 103, and 105. To that end, the nodes within network 100 distribute data (e.g., packet-based messages, etc.) in accordance with mesh networking, in which each node relays data for the network. The nodes that are involved cooperate in the distribution of data in the network. In doing so, the nodes in the mesh network can relay messages using either a flooding technique or a routing technique. Mesh network 100 includes multiple mesh nodes, in which each mesh node, including nodes 101, 103, and 105, can be part of one or more subnets.

In accordance with the illustrative embodiment, mesh network 100 uses Bluetooth as the underlying radio technology to communicate among the nodes and devices. As those who are skilled in the art will appreciate after reading this specification, network 100 can use a different radio technology than Bluetooth. The requirements to enable an interoperable mesh networking for Bluetooth wireless technology are defined in the Bluetooth Mesh Networking specifications, including the "Mesh Profile Specification" (hereinafter "Mesh Profile"), Revision v1.0.1, Jan. 21, 2019, which is incorporated by reference herein. The Bluetooth Mesh Profile builds on Bluetooth Low Energy (BLE).

Additional information is defined in the "Bluetooth Core Specification" (hereinafter "Core"), Revision v4.0 or later, which is incorporated by reference herein. The relevant sections of the aforementioned Mesh Profile and Core documents are referred to throughout the rest of the Description below and define, at least in part, the one or more Bluetooth Specifications referred to herein and in the claims.

Each mesh node in FIG. 1, including nodes 101, 103, and 105, is an apparatus that comprises memory, processing components, and communication components. In addition to communication with other nodes, each mesh node is capable of performing one or more functions, including the transmitting, receiving, and processing of Bluetooth Mesh packets, including packet 111. For example, first node 101 can be a switch that is capable of transmitting packets containing control or other information to control a third node 105, which can be a luminaire, wherein the PDUs can be relayed to node 105 by a second node 103. As those who are skilled in the art will appreciate after reading this specification, nodes 101, 103, and 105 can have other roles or additional roles than those described herein. Nodes 101, 103, and 105 are described in detail below and in regard to FIG. 2.

Each mesh node can be a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, a building or household appliance, an access terminal, a computer, a laptop computer, a desktop computer, a tablet computer, and so on, for example and without limitation.

Device 107 is a device running an app that can be used to provision and/or commission nodes 101, 103, and/or 105, as well as other mesh nodes. Device 107 can be a wireless terminal or device, a wireless transmit/receive unit (WTRU), a user equipment (UE), a mobile station, wireless handset, a fixed or mobile subscriber unit, a cellular telephone or cellphone, a smartphone, a pager, a personal digital assistant (PDA), an Internet of Things (IoT) device, a building or household appliance, an access terminal, a computer, a laptop computer, a desktop computer, a tablet computer, and so on, for example and without limitation.

This description uses terminology associated with the Bluetooth and Bluetooth LE standards. As those who are skilled in the art will appreciate after reading this specification, however, the concepts can be applied to other technologies and standards that involve modulating and transmitting digital data. Such technologies and standards include, but are not limited to, Z-Wave, ZigBee, Thread, Wi-Fi, classic Bluetooth, and so on. Accordingly, while some of this description is provided in terms of Bluetooth standards, the systems and methods disclosed herein can be implemented more generally in wireless communication devices that might not conform to Bluetooth standards.

It should be noted that the Bluetooth Mesh protocol can be used on non-Bluetooth devices (e.g., a WiFi-Bluetooth gateway). These non-Bluetooth devices can implement Mesh to receive one or more packets 111 remotely over the Transmission Control Protocol (TCP) and/or User Datagram Protocol (UDP) and then may send one or more packets 111 over BLE.

Figure 2:
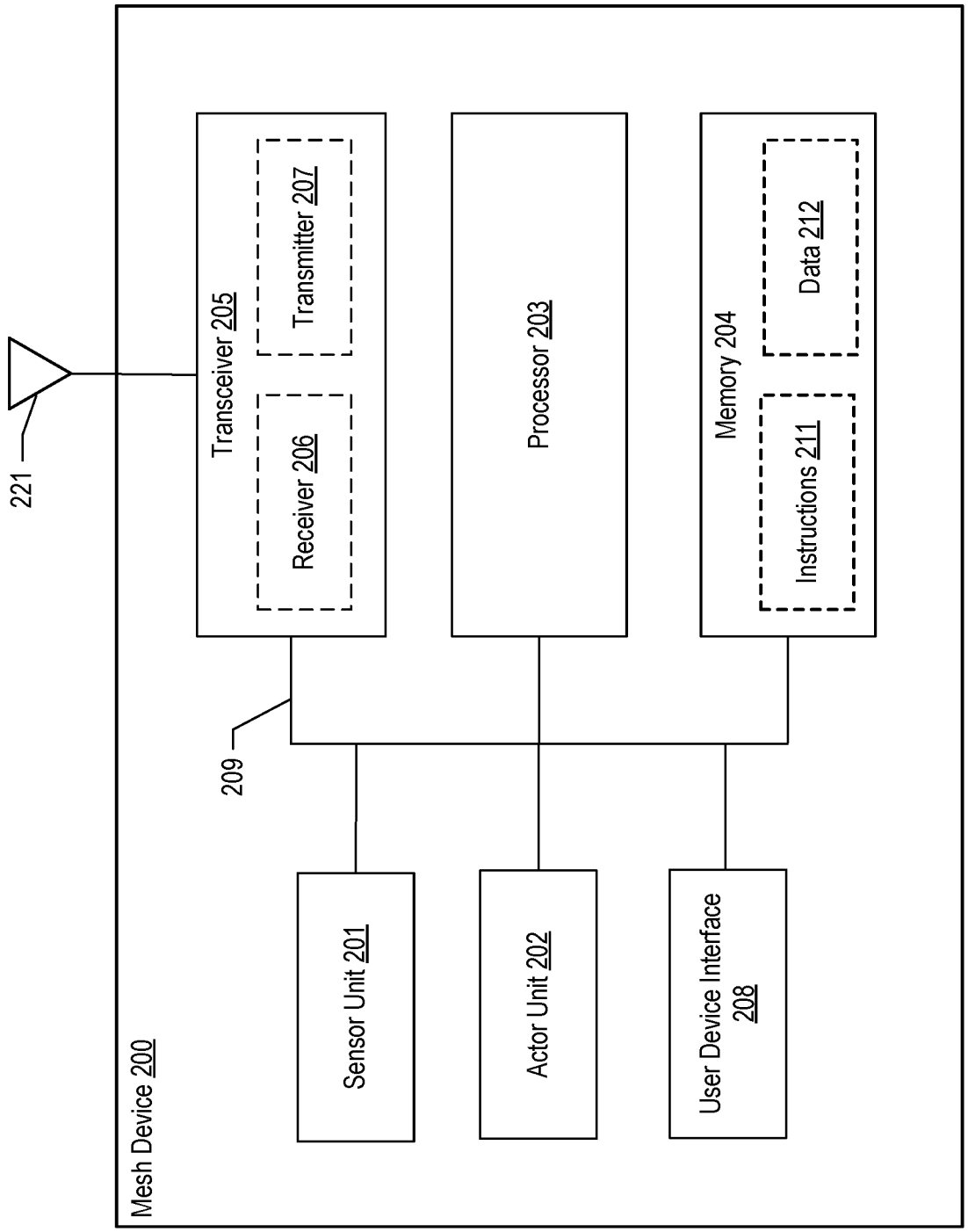
FIG. 2 depicts the salient components of mesh device 200 according to the illustrative embodiment.

FIG. 2 depicts the salient components of mesh device 200 according to the illustrative embodiment. Device 200 is based on a data-processing apparatus whose hardware platform comprises at least some of: sensor unit 201, actor unit 202, processor 203, memory 204, transceiver 205, and user device interface 208, interconnected as shown. Mesh device 200 is a device (e.g., a Bluetooth device, etc.) that is capable of being provisioned and thus becoming a mesh node and a member of mesh network 100. For example, the mesh device 200 can be provisioned as first node 101 or second node 103 or third node 105 of FIG. 1.

Various nodes within mesh network 100 can comprise different combinations of sensors, actors, processors, memory, and transceivers. For example, some nodes within mesh network 100, such as third node 105, can comprise a controllable lamp (i.e., an actor unit), a processor, and, optionally, a sensor unit (e.g., ambient light sensor, occupancy sensor, etc.), although some such nodes might not comprise a sensor unit. Some other nodes within mesh network 100, for example, can comprise a sensor unit and a processor, but not necessarily an actor unit (e.g., lamp, etc.). Some nodes, such as first node 101, comprise a switch with which a user can control a lamp (e.g., in third node 105, etc.). Second node 103, serving as a relay node in the illustrative embodiment, might comprise one or more sensor units and/or actor units, or might not comprise any such units. As those who are skilled in the art will appreciate after reading this specification, different configurations of mesh nodes are possible, wherein each node is based on one or more of the components that are described below.

Sensor unit 201 is an apparatus that comprises memory, processing components, and communication components, and is configured to gather information about the environment that is accessible by the sensor unit. Mesh device 200 can have one or more sensor units, wherein each sensor is configured to monitor a particular physical condition (e.g., temperature, ambient light, humidity, occupancy, etc.).

Each sensor unit is configured to report a state of the condition by providing input signals to processor 203, wherein the values of the input signals are representative of the states being reported. A given sensor unit 201 can report discrete input signal values and/or a continuum of states and can report states at particular times and/or continuously. A change in state, which is determined by processor 203 as described below, can occur based one or more sensor units detecting changes in the following, in any combination:
 i. environmental probes (e.g., temperature, ambient light, motion or occupancy, infrared signature, humidity, etc.).
 ii. electrical inputs (i.e., binary, analog, bus), including from a switch.
 iii. signals received via radio (e.g., proximity beacons, etc.).
 iv. a state of the internal logic, woken up periodically based on time or on an external event.

For example and without limitation, a state change can correspond to a switch being actuated, occupancy being detected, occupancy not being detected, a timer or counter reaching a predefined value, and so on.

Actor unit 202 is an apparatus that comprises memory, processing components, and communication components, and is capable of doing something in the course of being affected by signals originating externally to the actor component, such as from processor 203, as described in detail below. Mesh device 200 might have one or more actor units, wherein each actor unit acts upon its environment.

Actor unit 202 is configured to receive, transmit, process, and/or relay signals conveying data, as well as being configured to affect a condition, physical or otherwise, in its environment, for example by generating a control signal. Actor unit 202 provides a predetermined function, such as controlling a lamp to give light according to a configurable light output. For example and without limitation, the condition being affected can be:
 i. lighting, which can be adjusted (e.g., turning on or off, changing light output, changing brightness, changing color or mood, changing illuminance, displaying a picture or pattern, etc.).
 ii. sound, which can be adjusted (e.g., increasing or decreasing volume, changing playlist or mood, turning on/off, selecting signal source, etc.).
 iii. room climate, which can be controlled (e.g., increasing or decreasing temperature, humidity, air fragrance, fan speed, etc.).
 iv. an alert, which can be generated (e.g., of an email, of an SMS message, etc.).
 v. monitoring by a camera, which can be panned or tilted.
 vi. office meeting/presentation settings (e.g., selecting one or more of signal source, streaming application, multimedia to play, audio language, subtitles, chapter, play/pause/stop, rewind/fast forward, etc.).
 vii. connected/smart video monitor features (e.g., selecting application to be launched, navigating through on-screen menus, etc.).
 viii. virtual keyboard—navigation on virtual keyboard displayed by other device (e.g., video monitor, set-top box, etc.).
 ix. control of shades/window coverings/blinds.
 x. access control (e.g., unlocking/locking doors, opening/shutting doors, authorizing access to selected rooms or zones, etc.).

Furthermore, device 200 can comprise any combination of and any number of actor functions. As those who are skilled in the art will appreciate, after reading this disclosure, device 200 that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Processor 203 is a processing device such as a general-purpose single- or multi-chip microprocessor (e.g., an Advanced RISC [Reduced Instruction Set Computer] Machine [ARM]), a special purpose microprocessor (e.g., a digital signal processor [DSP]), a microcontroller, a programmable gate array, and so on. For example and without limitation, the processor can be part of an nRF52832 integrated circuit (IC) by Nordic Semiconductor, which is integrated with Bluetooth, or can be a SAM3X IC by Atmel Corporation.

Processor 203 is configured such that, when operating in conjunction with the other components of device 200, processor 203 executes software in the form of instructions 211, processes data in the form of data 212, and telecommunicates according to the operations described herein. Processor 203 can be referred to as a "central processing unit" (CPU). Although just a single processor 203 is shown as part of mesh device 200 of FIG. 2, in an alternative embodiment a combination of processors (e.g., an ARM and DSP) can be used.

Memory 204 is an electronic component capable of storing electronic information, and is in electronic communication with processor 203 (i.e., the processor can read information from and/or write information to the memory). Memory 204 can be configured as random-access memory (RAM), read-only memory (ROM), magnetic disk storage media, optical storage media, flash memory, on-board memory included with the processor, erasable programmable read-only memory (EPROM), electrically erasable programmable read-only memory (EEPROM), registers and so forth, including combinations thereof. At least some of memory 204 is non-transitory and non-volatile computer storage memory technology that is known in the art.

Memory 204 is configured to store an operating system, application software in the form of instructions 211, and a database in the form of data 212. The operating system is a collection of software that manages device 200's hardware resources and provides common services for computer programs, such as those that constitute the application software.

The application software that is executed by processor 203 according to the illustrative embodiment enables device 200 to perform the functions disclosed herein. Instructions 211 that constitutes the application software can include one or more programs, routines, sub-routines, functions, procedures, code, and so on. The instructions may include a single computer-readable statement or many computer-readable statements. Instructions 211 may be executable by processor 203 to implement the methods disclosed herein. Executing the instructions may involve the use of the data 212 that is stored in memory 205. When processor 203 executes instructions 211, various portions of the instructions can be loaded onto processor 203, and various pieces of data 212 can be loaded onto processor 203.

It will be clear to those having ordinary skill in the art how to make and use alternative embodiments that comprise more than one memory 204; or comprise subdivided segments of memory 204; or comprise multiple memory technologies that collectively store the operating system, application software, and database.

Transceiver 205, which is a communication interface, is configured to enable device 200 to telecommunicate with other devices and systems, including other mesh network nodes, by receiving signals therefrom and/or transmitting signals thereto via receiver 206 and transmitter 207, respectively. Transceiver 205 communicates in accordance with Bluetooth mesh networking. In some other embodiments, transceiver 205 communicates via one or more other radio telecommunications protocols other than or in addition to Bluetooth mesh networking, as described earlier.

Receiver 206 is a component that enables device 200 to telecommunicate with other components and systems by receiving signals that convey information therefrom and through antenna 221. It will be clear to those having ordinary skill in the art how to make and use alternative embodiments that comprise more than one receiver 206.

Transmitter 207 is a component that enables device 200 to telecommunicate with other components and systems by transmitting signals that convey information thereto and through antenna 221. It will be clear to those having ordinary skill in the art how to make and use alternative embodiments that comprise more than one transmitter 207.

In accordance with the illustrative embodiment, device 200 uses transceiver 205 in order to telecommunicate wirelessly with external devices. It will clear to those skilled in the art, however, after reading the present disclosure, how to make use and use various embodiments of the present invention in which device 200 communicates via a wired protocol (e.g., X10, KNX, DALI, etc.) over physical media (e.g., cable, wire, etc.) with one or more external devices, either in addition to or instead of the wireless capability provided by transceiver 205. In some embodiments of the present invention, transceiver 205 is implemented on hardware that is physically distinct from that of processor 203, while in some other embodiments transceiver 205 is implemented on the same hardware (IC) as processor 203.

As depicted, mesh device 200 has a single transceiver 205. As those who are skilled in the art will appreciate after reading this specification, mesh device 200 can have multiple transceivers. Furthermore, each transceiver 205 can have one or more receivers 206 and/or one or more transmitters 207.

In some embodiments of the present invention, mesh device 200 also comprises user device interface 208. Interface 208 enables a user to interact with mesh device 200 and can comprise a touchscreen, a keyboard, a pointing device, a display, and so on, for example and without limitation.

The various components of mesh device 200 can be coupled together by one or more buses, which may include a power bus, a control signal bus, a status signal bus, a data bus, and so on. For purposes of clarity, the various buses are illustrated in FIG. 2 as bus system 209.

Figure 3:
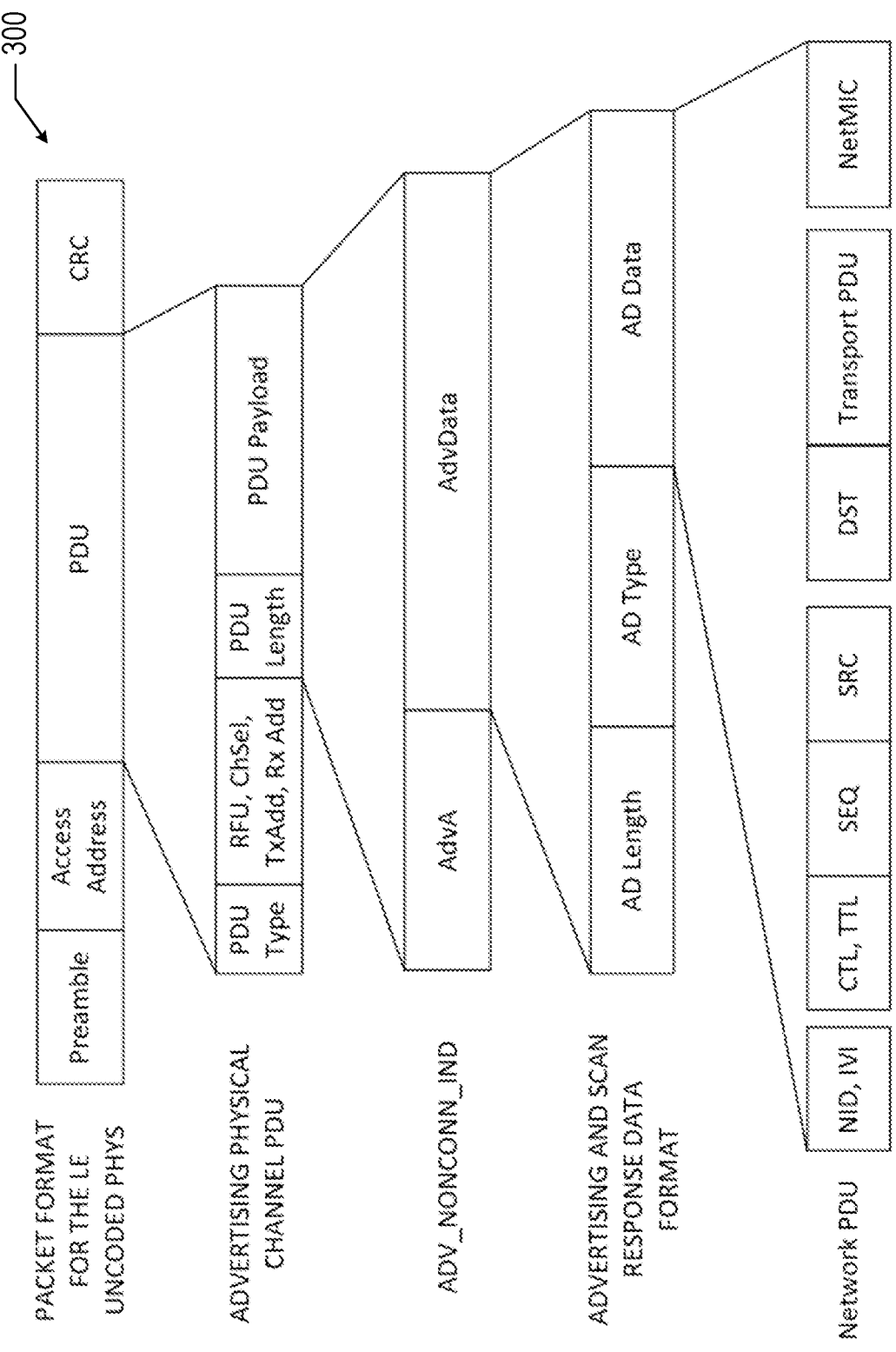
FIG. 3 depicts Bluetooth mesh packet 300 according to Bluetooth message specifications.

FIG. 3 depicts Bluetooth mesh packet 300 according to Bluetooth message specifications. Mesh packet 300 represents a particular format of mesh packet 111. As those who are skilled in the art will appreciate, after reading this specification, other formats of packets are possible.

Packet 300 comprises a Preamble, an Access Address field, a Protocol Data Unit (PDU), and a Cyclic Redundancy Check (CRC) field. The Access Address is a specification-defined constant for Advertising, as defined in the Core document. The CRC is computed over the PDU.

The PDU comprises a PDU Type field, an RFU/ChSel/TxAdd/RxAdd field, a PDU Length field, and a PDU Payload field. The PDU Type for Mesh networking is non-connectable and non-scannable undirected (ADV_NONCONN_IND, as defined in the Mesh Profile document).

The PDU Payload comprises an AdvA field and an AdvData field. The AdvA field is not used in the Mesh Profile document.

The AdvData field is a single Advertising Data (AD) Structure consisting of AD Length, AD Type=<<Mesh Message>>, and AD Data.

The Mesh Network PDU (i.e., "AD Data"), part of the Mesh Profile, uses 29 octets and has the following sections:
  i. Plain text Network Identifier (NID) field and Least Significant Bit of IV Index (IVI) field consisting of a single octet, and
  ii. Obfuscated Network Control (CTL) field, Time To Live (TTL) field, Sequence Number (SEQ) field, and Source Address (SRC) field consisting of six octets, and
  iii. Encrypted and authenticated Destination Address (DST) field, Transport PDU field, and Message Integrity Check for Network (NetMIC) field making up multiple octets.

The "NID," or "Network Identifier," identifies which mesh network the packet belongs to. The NID enables a lookup of Network Keys, or "NetKey." A NetKey is used in authentication and encryption operations, as explained later. Each mesh node may be provisioned with one or more network keys. Each NetKey is 128 bits long and hashes to seven bits, which is the NID. Hashes can collide, so two different NetKey values can result in the same NID value.

As defined in the Mesh Profile document, the NetMIC field is a 32-bit or 64-bit field, depending on the value of the CTL bit, and is used to authenticate that the DST and Transport PDU have not been changed.

The inventors appreciated that certain aspects of the packet format described above can be accounted for in order to optimize the processing of packet 300, and in at least four distinct ways. First, many fields in a BLE packet are redundant in respect of the Bluetooth Mesh Profile. Such fields include:

i. Access Address,
ii. PDU Type,
iii. PDU Length,
iv. AdvA,
v. AD Length, and
vi. AD Type.

One implication of this redundancy is that an invalid CRC might be attributable solely to one or more of the redundant fields. Thus, a mesh packet comprising an invalid CRC might still contain sufficient valid information and, consequently, mesh node 200 processes the packet further, in accordance with the illustrative embodiment.

Second, Bluetooth Mesh PDU integrity is protected by the NetMIC field independently of protection provided by the CRC field. Thus, mesh node 200 uses NetMIC to validate information within a mesh packet, in essence making the CRC redundant as well, in some embodiments of the present invention.

Third, the CTL, TTL, SEQ, and SRC fields are obfuscated. Accordingly, mesh node 200 uses the NetMIC field to validate indirectly the integrity of all of those fields, in some embodiments of the present invention.

And fourth, mesh node 200 uses the NetMIC field to validate indirectly the NID and IVI fields as well, in some embodiments of the present invention.

The aforementioned improvements are explained in the description below and depicted in the corresponding figures.

Figure 4A:
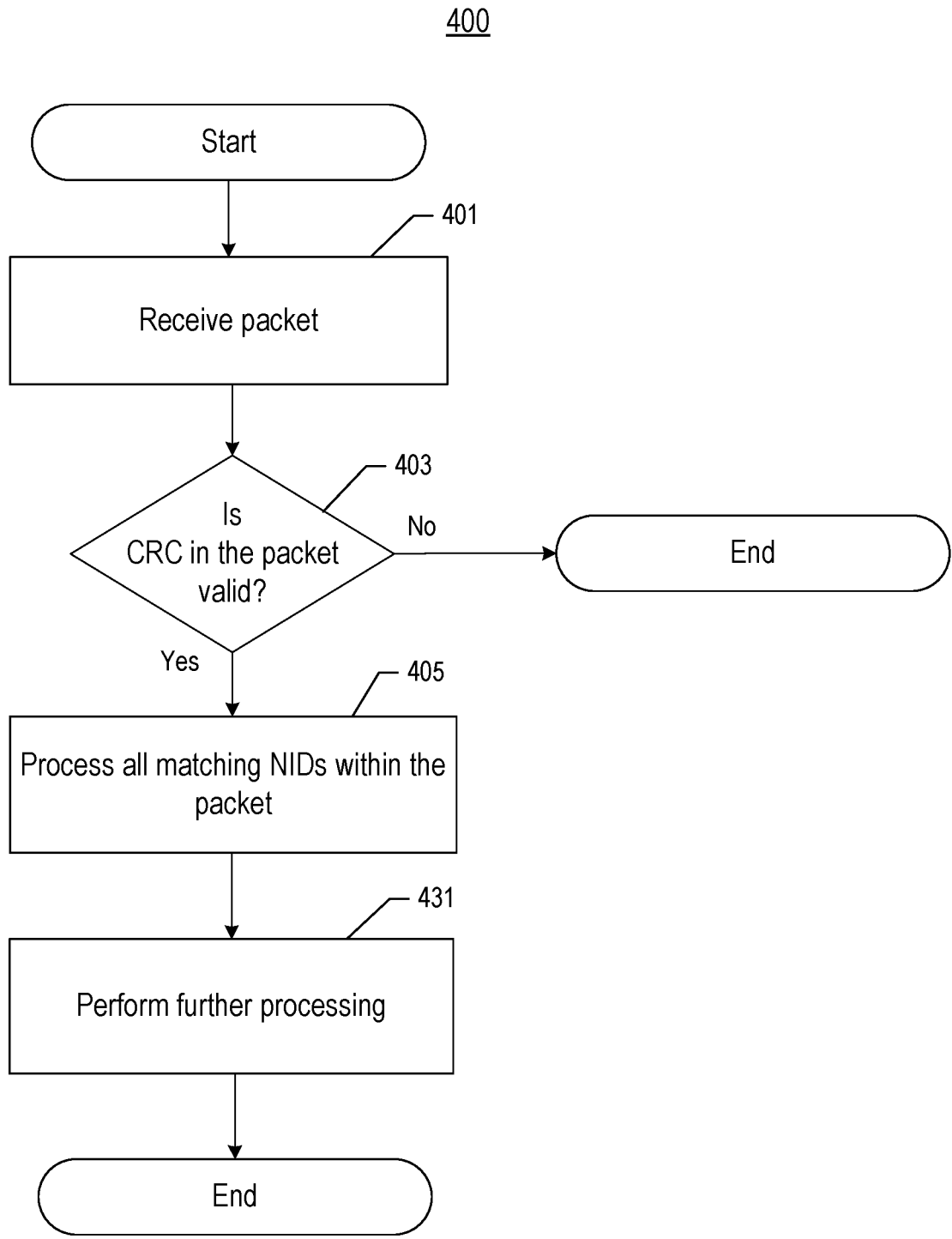
FIGS. 4A and 4B in the prior art depict a flow diagram illustrating method 400 in the prior art for conventional message processing of a Bluetooth Mesh packet.
Figure 4B:
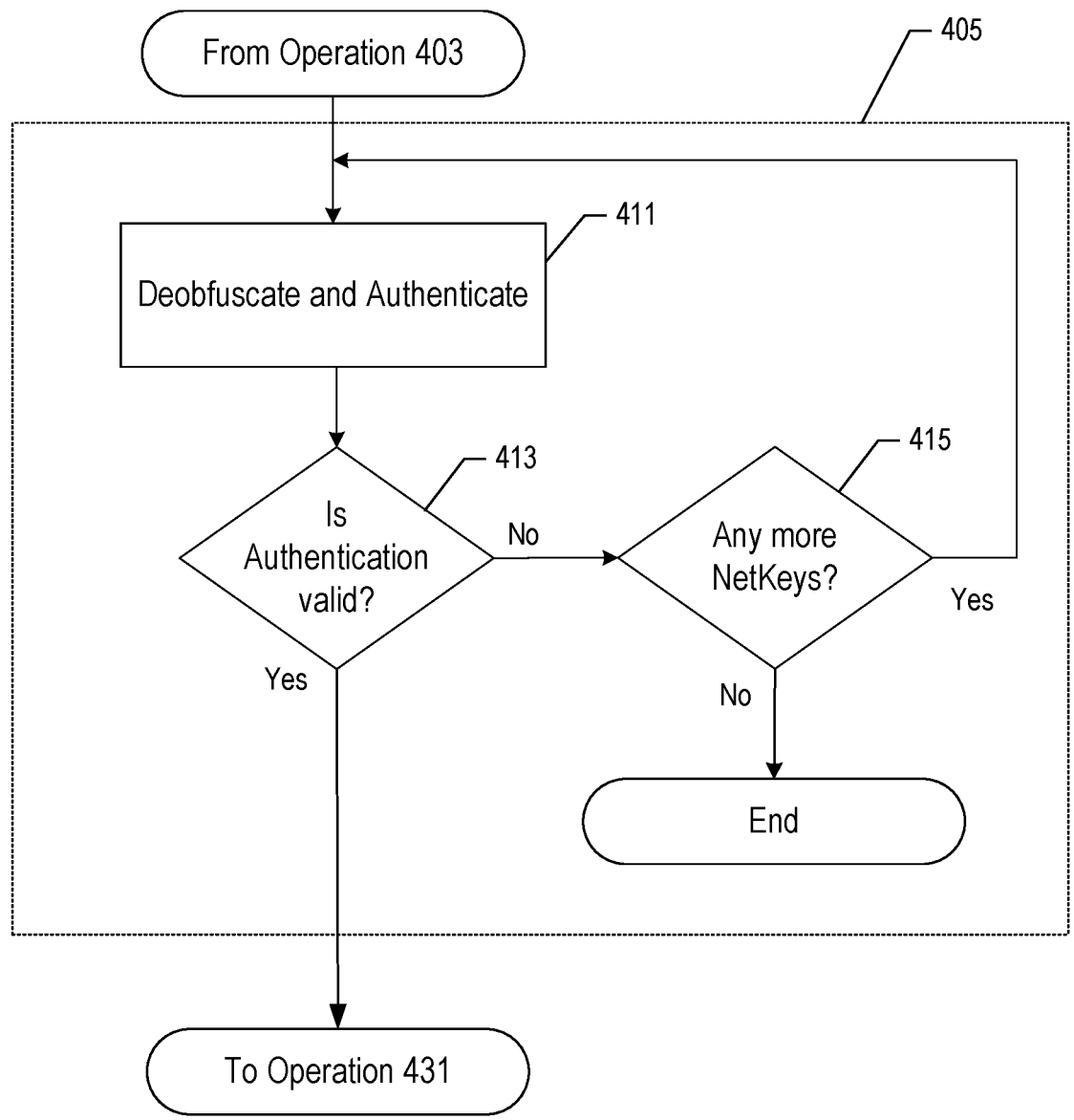

In order to better appreciate the improvements disclosed herein, a summary of message processing in the prior art is provided here. FIGS. 4A and 4B depict a flow diagram illustrating method 400 in the prior art for conventional message processing of a Bluetooth Mesh packet according to Bluetooth message specifications (i.e., the Mesh Profile document). For pedagogical purposes, and being capable of conventional message processing of a Bluetooth Mesh packet, mesh node 105 is featured in the description that follows.

In accordance with operation 401, mesh node 105 receives one or more packets 300.

In accordance with operation 403, mesh node 105 determines whether the CRC in received packet 300 is valid. If the CRC is valid, control of task execution proceeds to operation 405. If the CRC is invalid, control of task execution ends.

In accordance with operation 405, mesh node 105 processes all matching NIDs—that is, a NID field value in packet 300 to which multiple NetKey values known to mesh node 105 hash. The processing for each matching NID is represented by operations 411 through 415 in FIG. 4B, wherein one or more of said operations are repeated for each matching NID. The processing of matching NIDs is necessary because, as explained earlier, hashes can collide; consequently, two different NetKey values can result in the same NID value.

In accordance with operation 411, mesh node 105 deobfuscates and authenticates one or more fields in packet 300 based on the Network Key (NetKey) corresponding to the current matching NID.

In regard to encryption, decryption, and authentication, a security function in the mesh node encrypts (if transmitting) or decrypts and authenticates (if receiving) in accordance with CCM. Counter with CBC-MAC (i.e., "CCM") is a generic authenticated encryption block cipher mode defined for use with 128-bit block ciphers, such as the Advanced Encryption Standard (AES).

The Mesh security function encrypts, at a transmitting node such as mesh node 101, unencrypted information, resulting in obfuscated information. It is also used to decrypt, at a receiving node such as mesh node 105, the obfuscated information, also based in part on the network key. The Mesh security function is described in detail in the Mesh Profile.

In accordance with operation 413, mesh node 105 determines whether the authentication associated with the current iteration is valid. If the authentication is valid, control of task execution proceeds to operation 431. If the authentication is not valid, control of task execution proceeds to operation 415.

In accordance with operation 415, mesh node 105 determines whether there are any more matching NIDs to process. If there are more matching NIDs, then control of task execution proceeds to operation 411 to process using the next NetKey associated with the NID. If there are no more matching NIDs to process, node 105 ends processing on packet 300.

In accordance with operation 431, node 105 performs further processing on packet 300 on the authenticated data.

Figure 5:
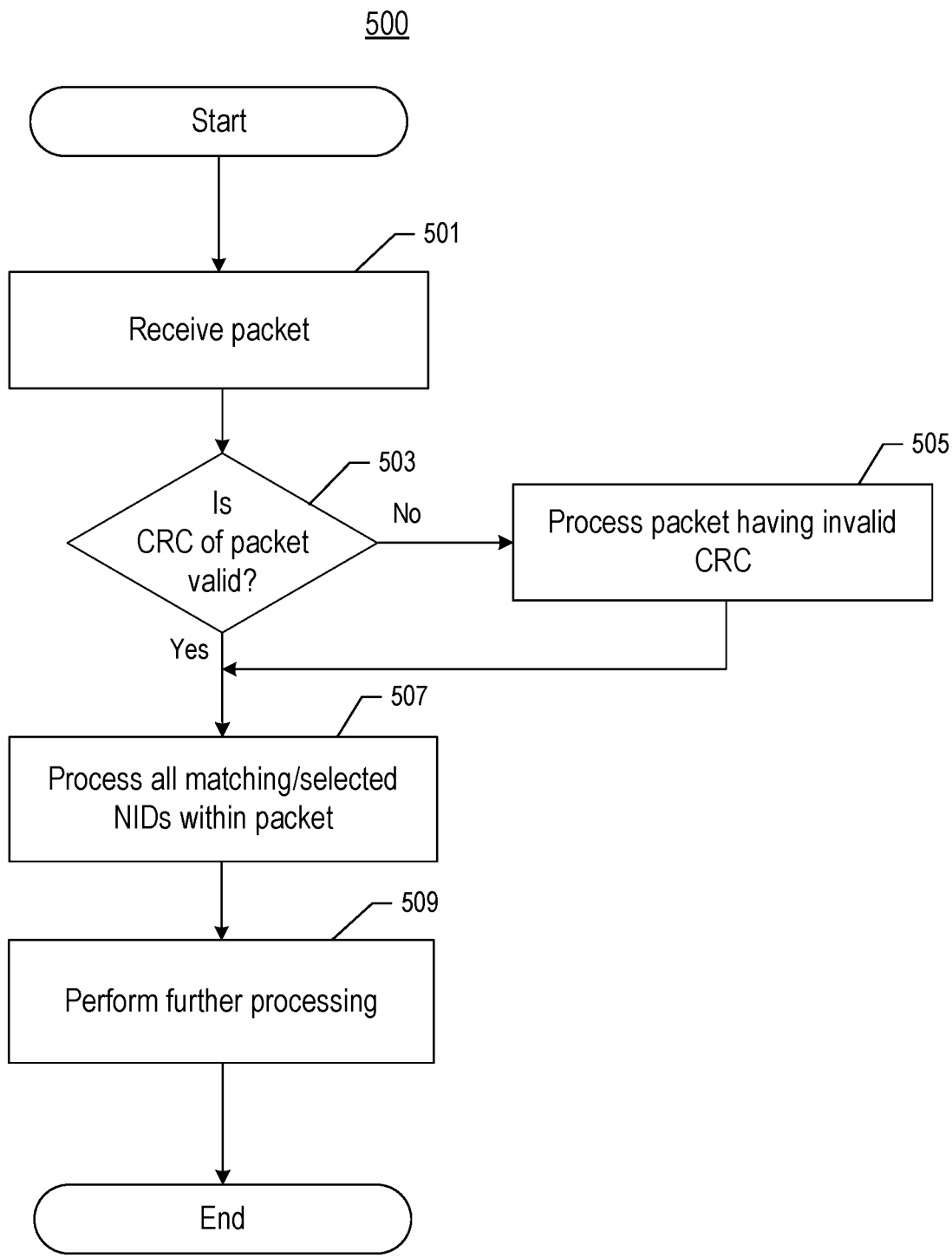
FIG. 5 depicts a flow diagram illustrating method 500 for enhanced message processing of a Bluetooth Mesh packet in accordance with the illustrative embodiment.

FIG. 5 depicts a flow diagram illustrating method 500 for enhanced message processing of a Bluetooth Mesh packet in accordance with the illustrative embodiment. It will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention.

It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods. For example and without limitation, the sub-operations within operation 505 and the sub-operations within operation 507 can be practiced independently of one another.

For pedagogical purposes, mesh node 105 is featured in the description that follows. As those who are skilled in the art will appreciate after reading this specification, other mesh nodes within wireless network 100 are also capable of performing the enhanced processing described below.

In accordance with operation 501, mesh node 105 receives one or more packets 300. In general, the formats of the fields in the one or more packets 300 are defined in the Bluetooth Core Specification and the content is defined in the Bluetooth Mesh Specification.

In accordance with operation 503, mesh node 105 determines whether the CRC in received packet 300 is valid. If the CRC is invalid, mesh node 105 at operation 505 processes packet 300 having the erroneous CRC. Operation 505 is described below and in regard to FIG. 6.

In accordance with operation 507, mesh node 105 processes all matching NIDs within packet 300, in the case of the CRC being valid, or the NIDs selected in accordance with operation 505. Operation 507 is described below and in regard to FIG. 8.

In accordance with operation 509, node 105 performs further processing on packet 300 that is beyond the scope of this specification.

Figure 6:
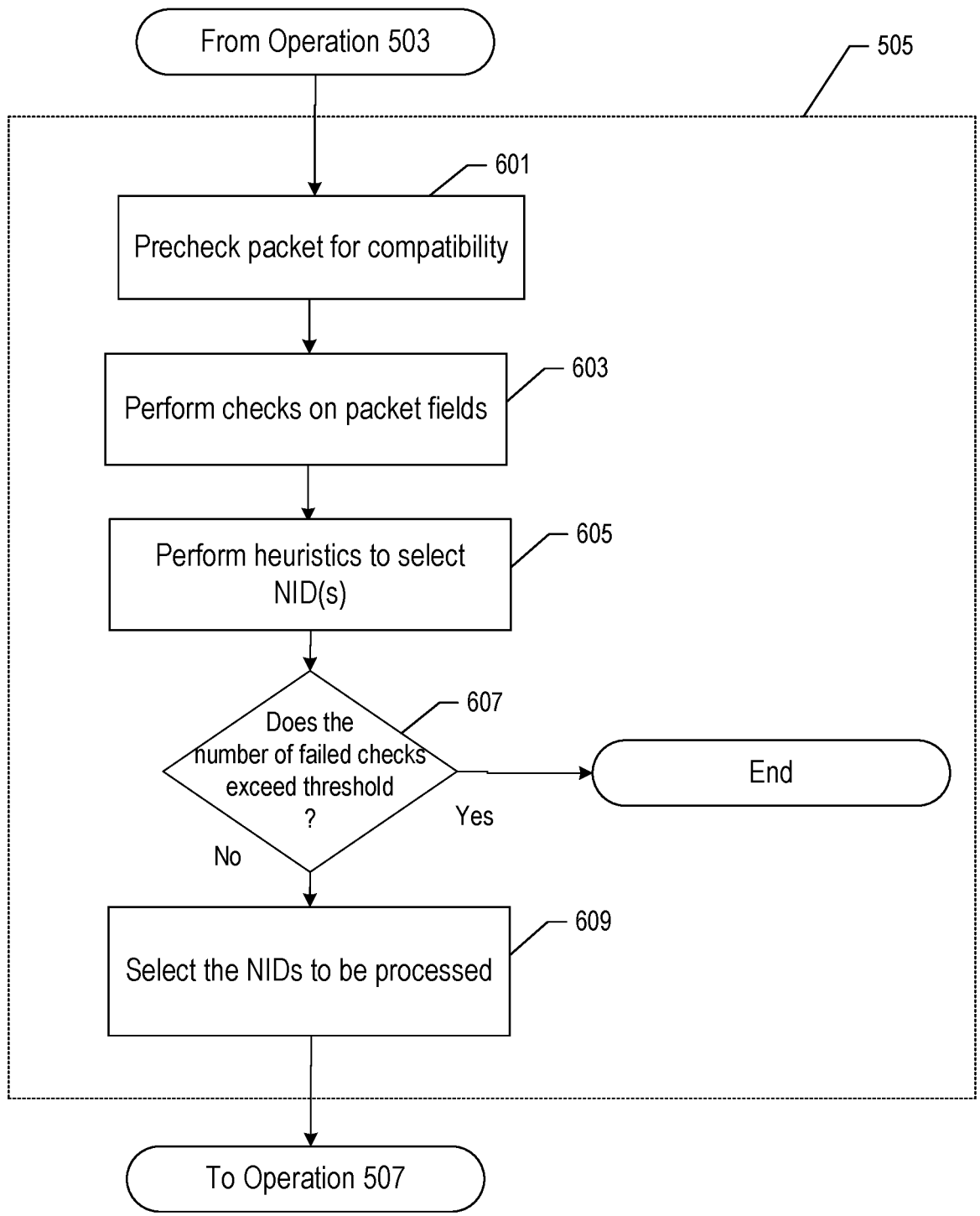
FIG. 6 depicts operation 505 for processing packet 300 having an erroneous CRC.

FIG. 6 depicts a flow diagram illustrating operation 505 of method 500 for processing packet 300 having an erroneous CRC.

In accordance with operation 601, mesh node 105 prechecks packet 300 for compatibility. As part of the precheck, an incompatible packet is rejected by checking the total number of octets in the packet against limits imposed by the Mesh Profile document. For example, an incompatible packet might be the result of the reception of two overlapping packets, in which the length of such a packet is too long for the Mesh Profile, even though the beginning of the packet appears to conform to an appropriate structure.

In operation 603, mesh node 105 performs checks on various packet fields within a compatible packet 300. Such a packet has one or more incorrect bits, as evidenced by the erroneous CRC, even though the length and general structure of the packet is correct. Each check can be independent of one another, and the results (i.e., "true" or "false") can be used in the next step.

The packet fields and corresponding checks are as follows:
  i. H Field—Check if H, "HEADER," is as required by the Mesh Profile document. "HEADER" refers to the 16-bit PDU header. In some embodiments, the Advertising PDU header consists of (a) the PDU Type field, (b) the RFU/ChSel/TxAdd/RxAdd field, and (c) the PDU Length field depicted in FIG. 3.
  ii. HL Field—Check HL, or "header length," against the packet length. "HL" is the "PDU length," which is depicted in FIG. 3.
  iii. ADL Field—Check ADL, or "AD Length," against the packet length. "AD Length" is the AD structure length of a particular AD structure and is depicted in FIG. 3.
  iv. ADT Field—Check if ADT, or "AD Type," is as required by the Mesh Profile document.
  v. NID Field—Check if NID is in the NID Accept List, a predetermined set of NIDs known to node 105. In some embodiments of the present invention, the NID values in the NID Accept List are ordered in terms of probability of correctness (i.e., highest to lowest).
  vi. BDA Field—Check if the BDA, or "Bluetooth Device (BD) Address," (a) is in a predetermined BD Address Accept List, or (b) validates in the resolving list (e.g., Resolvable Private Address or "RPA"). In some embodiments of the present invention, either (a) or (b), but not both, can be used in one network and must be used by all nodes in that network.

In accordance with the illustrative embodiment, packet 111 contains a BD Address value in a field that is unused in the Mesh Specification (e.g., the AdvA field, etc.). The checking of field BDA is optional because it requires additional implementation, while the other checks listed above can always be used because they involve checking conditions of fields defined in the Bluetooth Core and Bluetooth Mesh Profile specifications. The BD Address value may be checked by mesh node 105 using some predetermined schema and thus can be included in a heuristic that determines which part of the PDU has some error bits. Such a check does not require the address value to be assigned by the manufacturer, although it might be. For example and without limitation, in the case of implementing a resolvable private address, a random number generator can be used to determine address value.

In operation 605, mesh node 105 performs heuristics for the purpose of validating the NID and other fields, in view of the CRC being erroneous. In particular, the purpose of the heuristics is to estimate in which field the bit or bits are incorrect. The general approach is to check combinations of field values for consistency. When the values within a given field are consistent with one another, it is inferred that a different field than the given field being checked contains the incorrect bit or bits.

The NID selection heuristics include at least some of those depicted in method 700 of FIG. 7. Method 700 comprises NID selection heuristics and depicts the logic of the NID set selection, given the results of each of the individual checks performed at operation 603. The "check X" (e.g., "check H") parameters correspond to the corresponding results (i.e., "true" or "false") of the lists of fields that are checked above and in regard to operation 603. As those who are skilled in the art will appreciate after reading this specification, variations of the heuristics performed in method 700 are possible.

As an overview of method 700, when more than one test fails, mesh node 105 stops packet processing. On the other hand, when no tests fail or if at least the NID check passes, it is assumed that the NID is valid and node 105 goes on to process packet 300 using only the network keys relevant to the NID assumed valid, in the processing subsequent to method 700. If the NID check fails, then node 105 goes on to process packet 300 using network keys corresponding to all possible NIDs, in the processing subsequent to method 700.

In accordance with operation 607, mesh node 105 determines whether the number of failed checks in the NID selection heuristics in operation 605 exceeds a predetermined threshold. If the number does not exceed the threshold, control of task execution proceeds to operation 609. Otherwise, processing ends for the packet.

Figure 8:
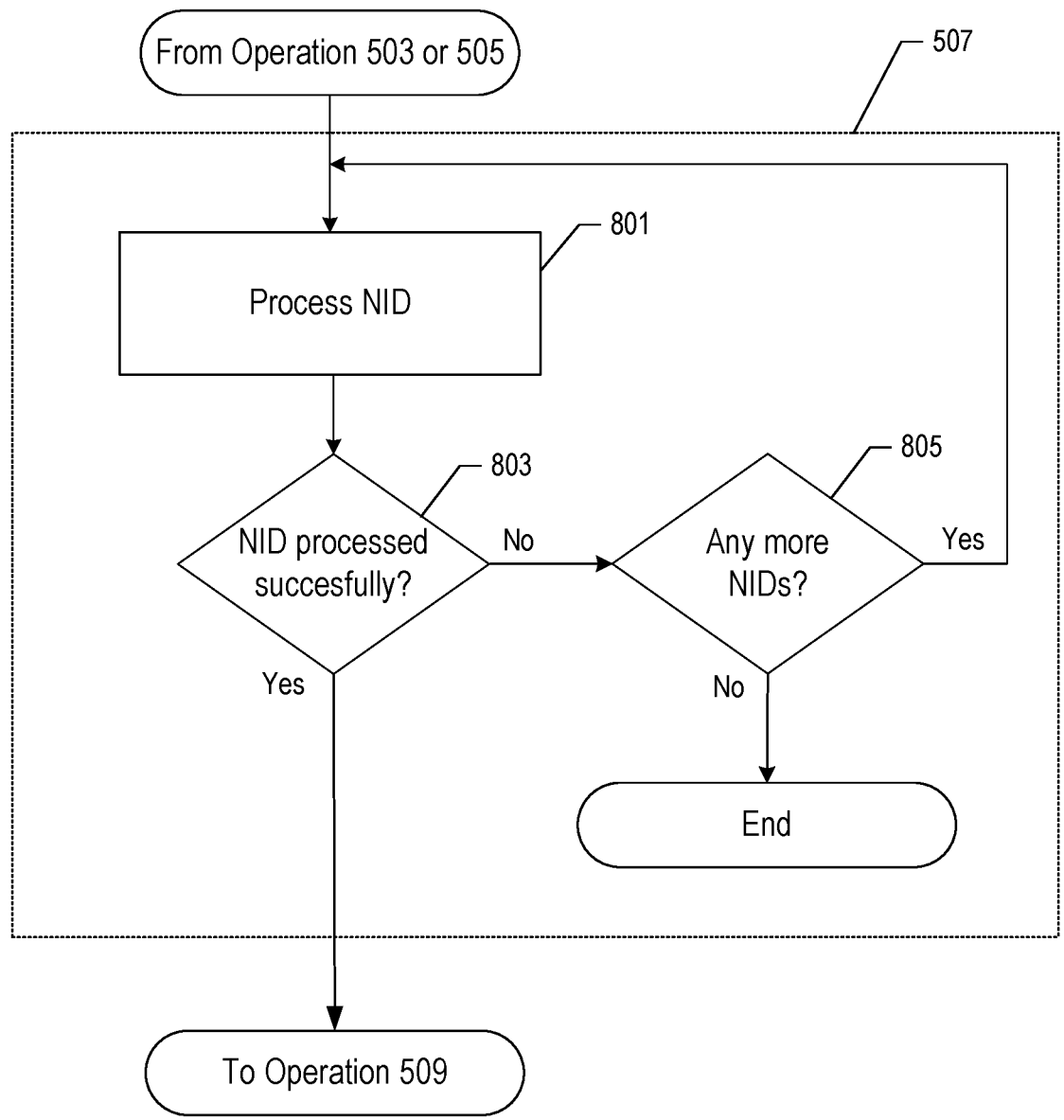
FIG. 8 depicts operation 507 for processing selected NIDs for packet 300.

In accordance with operation 609, mesh node 105 determines which NIDs are to be processed—and, by extension, which network keys are to be used—in accordance with operation 507 depicted in FIG. 8. If the NID check in operation 605 passes, the NID received in packet 300 is assumed to be valid and node 105 selects it as a NID to be used for subsequent processing. Otherwise, if the NID check in operation 605 fails, node 105 includes, on the selected NID set, all possible NIDs from the NID Accept list because the correct NID value could be any one of multiple values.

FIG. 8 depicts operation 507 for processing selected NIDs for accepted packet 300. In accordance with operation 507, mesh node 105 processes all matching or selected NIDs, wherein one or more NetKeys can hash to a given NID value. An accepted packet exists because either the CRC was determined to be valid or, in the case of an invalid CRC, a set of selected NIDs exists based on processing in accordance with operation 505. Because the CRC in packet 300 is erroneous in the branch of processing involving operation 505, the NID set generated can be larger than for an error-free CRC.

In accordance with operation 801, mesh node 105 processes packet 300 based on one or more Network Keys (NetKey) corresponding to the current matching NID. Operation 801 described in detail below and in FIG. 9.

In accordance with operation 803, mesh node 105 proceeds to operation 805 if packet 300 has not been processed successfully by any of the Network Keys that hash to the current NID. Otherwise, control of task execution proceeds to operation 509.

In accordance with operation 805, mesh node 105 determines whether there are any more matching NIDs to process. If there are more matching NIDs, then control of task execution proceeds to operation 801 to process using one or more Network Keys that hash to the next NID. If there are no more NIDs to process, node 105 ends processing on packet 300.

Figure 9:
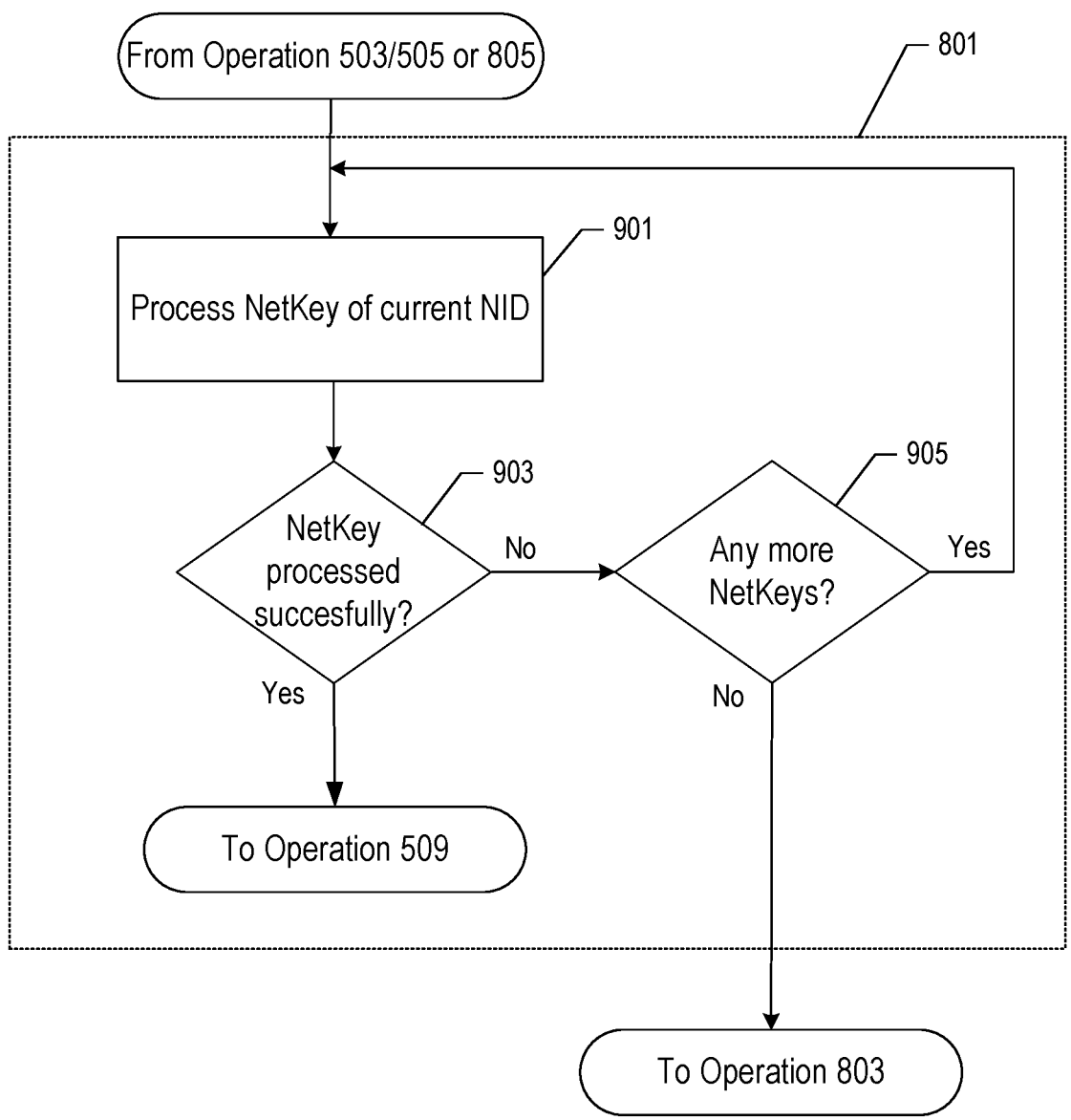
FIG. 9 depicts operation 801 for processing a given NID, of one or more NIDs.

FIG. 9 depicts operation 801 for processing a given NID, of one or more NIDs.

As an overview, the operations that make up operation 801 operate as follows. For each NID being processed, all network keys, or "NetKeys," that hash to the NID are determined and are saved to a set (e.g., a list, etc.). Then, the processing iterates over the NetKey set. In accordance with the illustrative embodiment, for each NetKey processed:
  i. Only a portion of a packet is decrypted initially, thereby conserving the processing time.
  ii. Multiple checks are performed, and when one fails the next NetKey is processed.
  iii. When all checks are positive, the processing decrypts and authenticates the rest of the packet. If the authentication is positive, the further processing (in operation 509) is performed. If the authentication is negative, the processing checks the next NetKey in the set.

In accordance with operation 901, mesh node 105 processes packet 300 based on the current Network Key (NetKey) corresponding to the current matching NID. Operation 901 described in detail below and in FIG. 10.

In accordance with operation 903, mesh node 105 proceeds to operation 905 if packet 300 has not been processed successfully based on the current Network Key. Otherwise, control of task execution proceeds to operation 509.

In accordance with operation 905, mesh node 105 determines whether there are any more Network Keys to process for the current NID. If there are more Network Keys, then control of task execution proceeds to operation 901 to process packet 300 using the next Network Key. If there are no more Network Keys to process, node 105 proceeds to operation 803.

Figure 10:
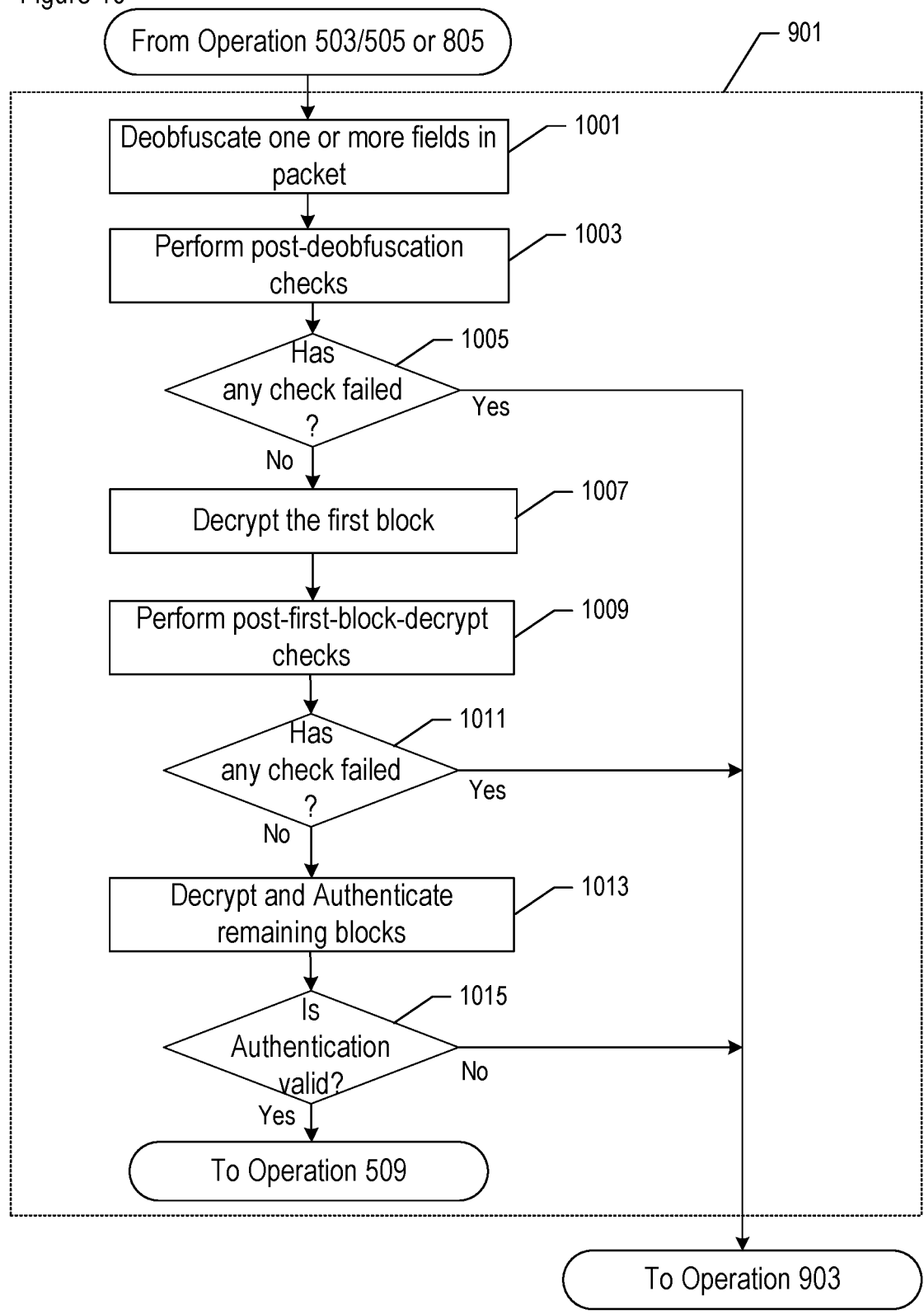
FIG. 10 depicts operation 901 for processing each network key for a particular NID.

FIG. 10 depicts operation 901 for processing each network key (NetKey) for a particular NID.

The optimizations performed in operation 901 enable the processing of such a larger set of NetKeys/NIDs without a significant performance penalty, in contrast with conventional method 400 depicted in FIGS. 4A and 4B. These operations are used to speed up the filtering out of Bluetooth Mesh packets that are from different mesh networks or packets that have decryption and/or authentication errors possibly due to imperfect reception, such as at least some packets with CRC errors.

In some embodiments of the present invention, at least some of the checks are optional. Each check decreases false positive situations that result in a processing time penalty in the last stage (i.e., decrypt other blocks).

In accordance with operation 1001, mesh node 105 deobfuscates one or more fields in packet 300 using the current NetKey for the current NID under consideration, including one or more of the TTL, CTL, SEQ, and SRC fields.

In accordance with operation 1003, mesh node 105 performs the first of two types of checks: the post-deobfuscation checks. The post-deobfuscation checks include:
  i. check if the SRC is in the SRC Accept List, and/or
  ii. check if TTL<N, wherein N is a positive integer.

In accordance with operation 1005, mesh node 105 ends the iteration of the current NetKey and proceeds to operation 903 if any of the post-deobfuscation checks fail. Otherwise, mesh node 105 proceeds to operation 1007.

In accordance with operation 1007, node 105 decrypts the first block of M octets, wherein M is a positive integer (e.g., M=4, M=6, M=16, etc.), in which it uses the AES-CCM algorithm to decrypt the first block. Per one AES operation, the CCM can process between 1 and 16 octets. As described earlier, AES is a block cipher of 16 octets, while CCM using Counter Mode can encrypt/decrypt and authenticate any number of octets that are not necessarily a multiple of 16.

In accordance with operation 1009, mesh node 105 then performs the post-first-block-decrypt checks, which is the second of the two types of checks. The post-first-block-decrypt checks include, in any combination:
  i. check if the DST is in the DST Accept List,
  ii. check if AID is in the AID Accept List, if applicable,
  iii. check if the AID and NID combination is allowed by NetKey-to-AppKey binding, if applicable,
  iv. check if SEG==1 and SegO<=SegN, and
  v. check if CTL==1 and Opcode is known, and the message length is valid for a given Opcode.

In accordance with operation 1011 mesh node 105 ends the iteration of the current NetKey and proceeds to operation 903 if any of the post-first-block-decrypt checks fail. Otherwise, mesh node 105 proceeds to operation 1013.

In accordance with operation 1013, mesh node 105 decrypts the rest of the blocks of octets from packet 300, by finishing the already-started AES-CCM algorithm. Mesh node 105 authenticates the decrypted payload.

In accordance with operation 1015, if the authentication result is valid, node 105 proceeds to operation 509. If the authentication is not successful, node 105 proceeds to operation 903.

One or more of the following Accept Lists can be used, in any combination, for the checks involved in operation 901:
  i. SRC Accept List,
  ii. DST Accept List, and
  iii. AID Accept List.

Node 105 uses the SRC Accept List to reject SRCs that are deemed to be invalid. The SRC Accept List represents the valid SRCs. For example, the List can be used to represent SRCs in a valid range (i.e., between "X" and "Y"). As another example, the validity of the SRC can be checked by examining the checksum of some bits.

A "checksum" algorithm can utilize any method to verify that a value is accepted by the list. Some bits from the value may be skipped by the algorithm since they may be used for other optimizations. Some nonlimiting examples of an algorithm that can be used are as follows:
  i. Simple sum—Arithmetically sum J bits, and compare the sum to K bits. Lowest L bits are not processed, in order to facilitate the adding of new nodes (i.e., with new SRCs) without having to modify the applicable Accept List.
  ii. CRC—Compute a CRC value from J bits, and compare the computed value to K bits. Lowest L bits are not processed (see above).
  iii. Expect that J bits are identical to K bits. Lowest L bits are not processed (see above). Example SRC: 0x5656—compare first 8 bits to last 8 bits.

iv. Expect that J bits are identical to K bits XOR-ed with a constant.
v. A check, such as a check of Resolvable Private Address, but using a different number of bits and/or different encryption method.

Node 105 uses the DST Accept List to reject DSTs that are deemed to be invalid. The DST Accept List represents the valid DSTs. For example, the List can be used to represent DSTs in a valid range (i.e., between "X" and "Y"). As another example, the validity of the DST can be checked by examining the checksum of some bits.

Node 105 uses the AID Accept List to reject AIDs that are deemed to be invalid. AID is analogous to NID, but applies to applications instead of networks. The AID Accept List represents the valid AIDs. For example, an AID value can be checked against an AID Accept List representing known AID values. As another example, a provisioner of a mesh device into a mesh node can choose application keys such that AIDs for them are equal. As a third example, the provisioner can choose application keys such that AIDs for them are in a predetermined range.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, flash storage, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, Blu-ray™ disc, and Ultra HD disc where disks usually reproduce data magnetically, while discs reproduce data optically with lasers.

It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for appropriate operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a first mesh node, one or more packets transmitted by a second mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications;
determining whether the value of the CRC field in a first packet of the one or more packets is valid or invalid;
after determining the value of the CRC field to be invalid, selecting a selected set of one or more NID values that comprise either (i) a predetermined set of multiple NID values or (ii) the value of the NID field in the first packet, based at least in part on validity of the value of the NID field in the first packet; and
processing at least some of the multiple octets in the AD Data field in the first packet in accordance with a set of network keys that hash to the one or more NID values in the selected set, wherein the processing comprises deobfuscating a first field;
wherein deobfuscating the first field comprises:
(i) selecting a first network key from the set of network keys,
(ii) deobfuscating the first field using the first network key, resulting in a deobfuscated first field, and
(iii) determining whether the value of the deobfuscated first field is valid or invalid.

2. The method of claim 1, further comprising determining whether the value of the NID field in the first packet is valid or invalid, wherein the validity of the value of the NID field is based on the value of the NID field being in the predetermined set of NID values.

3. The method of claim 1, wherein the PDU further comprises an AD Length field and an AD Type field, wherein the AD Length field and the AD Type field are defined as part of the one or more Bluetooth Specifications, and wherein the selecting is further based on the value of at least one of the AD Length field and the AD Type field in the first packet.

4. The method of claim 1, wherein the PDU further comprises a Header field and a Header Length field, wherein the Header field and the Header Length field are defined as part of the one or more Bluetooth Specifications, and wherein the selecting is further based on the value of at least one of the Header field and the Header Length field in the first packet.

5. The method of claim 1, wherein the PDU further comprises a Bluetooth Device (BD) Address, wherein the BD Address is represented in the PDU in bits that are unused in the one or more Bluetooth Specifications, and wherein the selecting is further based on the BD Address in the first packet.

6. The method of claim 1, wherein the AD Data field comprises (i) an SRC field and (ii) a TTL field, wherein the SRC field and the TTL field are defined as part of the one or more Bluetooth Specifications, and wherein the first field is one of (i) the SRC field and (ii) the TTL field.

7. The method of claim 1, further comprising:
after determining the value of the deobfuscated first field to be valid, decrypting, using the first network key, a first encrypted block of M octets within the AD Data field including a second field, resulting in decrypted octets including a decrypted second field, wherein M is a positive integer that is less than the total number of encrypted octets in the AD Data field;
determining whether the value of the decrypted second field is valid or invalid; and
authenticating at least the decrypted octets only if the value of the decrypted second field is valid.

8. A mesh node comprising:
a receiver configured to receive one or more packets transmitted by another mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications; and
a processor configured to:
(a) determine whether the value of the CRC field in a first packet of the one or more packets is valid or invalid,
(b) after determining the value of the CRC field to be invalid, select a selected set of one or more NID values that comprise either (i) a predetermined set of multiple NID values or (ii) the value of the NID field in the first packet, based at least in part on validity of the value of the NID field in the first packet, and
(c) process at least some of the multiple octets in the AD Data field in the first packet in accordance with a set of network keys that hash to the one or more NID values in the selected set, wherein the processor is configured to process by deobfuscating a first field;
wherein the deobfuscating of the first field comprises:
(i) selecting a first network key from the set of network keys,
(ii) deobfuscating the first field using the first network key, resulting in a deobfuscated first field, and
(iii) determining whether the value of the deobfuscated first field is valid or invalid.

9. The mesh node of claim 8, wherein the processor is further configured to determine whether the value of the NID field in the first packet is valid or invalid, wherein the validity of the value of the NID field is based on the value of the NID field being in the predetermined set of NID values.

10. The mesh node of claim 8, wherein the PDU further comprises an AD Length field and an AD Type field, wherein the AD Length field and the AD Type field are defined as part of the one or more Bluetooth Specifications, and wherein the processor is configured to select the selected set of one or more NID values further based on the value of at least one of the AD Length field and the AD Type field in the first packet.

11. The mesh node of claim 8, wherein the PDU further comprises a Header field and a Header Length field, wherein the Header field and the Header Length field are defined as part of the one or more Bluetooth Specifications, and wherein the processor is configured to select the selected set of one or more NID values further based on the value of at least one of the Header field and the Header Length field in the first packet.

12. The mesh node of claim 8, wherein the PDU further comprises a Bluetooth Device (BD) Address, wherein the BD Address is represented in the PDU in bits that are unused in the one or more Bluetooth Specifications, and wherein the processor is configured to select the selected set of one or more NID values further based on the BD Address in the first packet.

13. The mesh node of claim 8, wherein the AD Data field comprises (i) an SRC field and (ii) a TTL field, wherein the SRC field and the TTL field are defined as part of the one or more Bluetooth Specifications, and wherein the first field is one of (i) the SRC field and (ii) the TTL field.

14. The mesh node of claim 8, wherein the processor is further configured to:
decrypt, after determining the value of the deobfuscated first field to be valid and by using the first network key, a first encrypted block of M octets within the AD Data field including a second field, resulting in decrypted octets including a decrypted second field, wherein M is a positive integer that is less than the total number of encrypted octets in the AD Data field;
determine whether the value of the decrypted second field is valid or invalid; and
authenticate at least the decrypted octets only if the value of the decrypted second field is valid.

15. A non-transitory tangible computer readable medium storing computer executable code, comprising code for causing a mesh node to:
receive one or more packets transmitted by another mesh node, wherein each of the one or more packets comprises a Protocol Data Unit (PDU) and a cyclic redundancy check (CRC) field, wherein the PDU comprises an AD Data field with multiple octets and comprising a Network Identifier (NID) field, and wherein the PDU, the CRC field, the AD Data field, and the NID field are defined as part of one or more Bluetooth Specifications;
determine whether the value of the CRC field in a first packet of the one or more packets is valid or invalid;
after determining the value of the CRC field to be invalid, select a selected set of one or more NID values that comprise either (i) a predetermined set of multiple NID values or (ii) the value of the NID field in the first packet, based at least in part on validity of the value of the NID field in the first packet; and
process at least some of the multiple octets in the AD Data field in the first packet in accordance with a set of network keys that hash to the one or more NID values in the selected set, including deobfuscating a first field;
wherein the deobfuscating of the first field comprises:
(i) selecting a first network key from the set of network keys,
(ii) deobfuscating the first field using the first network key, resulting in a deobfuscated first field, and
(iii) determining whether the value of the deobfuscated first field is valid or invalid.

16. The computer readable medium of claim 15, further comprising code for causing the mesh node to determine whether the value of the NID field in the first packet is valid or invalid, wherein the validity of the value of the NID field is based on the value of the NID field being in the predetermined set of NID values.

17. The computer readable medium of claim 15, wherein the PDU further comprises an AD Length field and an AD Type field, wherein the AD Length field and the AD Type field are defined as part of the one or more Bluetooth Specifications, and further comprising code for causing the mesh node to select the selected set of one or more NID values further based on the value of at least one of the AD Length field and the AD Type field in the first packet.

18. The computer readable medium of claim 15, wherein the PDU further comprises a Header field and a Header Length field, wherein the Header field and the Header Length field are defined as part of the one or more Bluetooth Specifications, and further comprising code for causing the mesh node to select the selected set of one or more NID values further based on the value of at least one of the Header field and the Header Length field in the first packet.

\* \* \* \* \*